Dec. 29, 1931.  D. L. LINDQUIST ET AL  1,838,773

MOTOR CONTROL SYSTEM

Filed Dec. 3. 1927    3 Sheets-Sheet 1

Patented Dec. 29, 1931

1,838,773

UNITED STATES PATENT OFFICE

DAVID L. LINDQUIST, OF HARTSDALE, AND JACOB D. LEWIS, OF YONKERS, NEW YORK, ASSIGNORS TO OTIS ELEVATOR COMPANY, OF NEW YORK, N. Y., A CORPORATION OF NEW JERSEY

MOTOR CONTROL SYSTEM

Application filed December 3, 1927. Serial No. 237,413.

The invention relates to the control of alternating current motors and particularly of such motors which, once started, are adapted to run continuously for a considerable period of time during which they are intermittently subjected to load.

One feature of the invention is to reduce the no-load losses of such an alternating current motor to a minimum.

Another feature is to obtain a high power factor of the mains to which such motor is connected.

Other features and advantages will become apparent from the following description and appended claims.

The invention involves causing the excitation of an alternating current motor to be low during its starting and idling periods. The invention will be described as applied to a polyphase induction motor although it is to be understood that the invention is applicable to other types of alternating current motors, either single or polyphase.

Various arrangements may be employed for carrying out the invention. According to the preferred arrangement, a motor is employed having its phase windings designed for mesh operation under full load conditions and this motor is controlled in such manner that the phase windings are connected in star relation during idling and starting periods and in mesh relation when subjected to load. Thus, the magnetizing current of the motor is low during idling periods and therefore the no-load losses are minimized and the power factor of the supply lines is high. With such control, the average power factor may be made substantially unity for the whole operating period by the use of condensers, the size of which need only be sufficient to correct for the conditions obtaining when the motor is star connected and running idle.

The invention is particularly useful in elevator systems wherein the alternating current motor is employed as the driving motor of a motor-generator set of the Ward Leonard system, as in such systems the driving motor is idling over 50% of the time. The invention will therefore be described as embodied in an elevator system. In the elevator system chosen for purposes of illustration, both the starting and stopping of the elevator car are under the control of a car switch and the accuracy of the stop is made dependent upon the skill of the operator. It is to be understood, however, that the invention is applicable to other elevator systems such as those in which push button control is employed for causing both the starting and stopping of the car or those in which the starting of the car is under the control of an operator while the slow-down and stopping is automatic. Also, the invention is applicable to elevator systems in which self leveling mechanism is employed. In the elevator system chosen for purposes of description, the amount of excitation of the driving motor is controlled by the car switch. Other arrangements may be employed if desired.

The invention is embodied in the accompanying drawings, in which.

Figure 1:
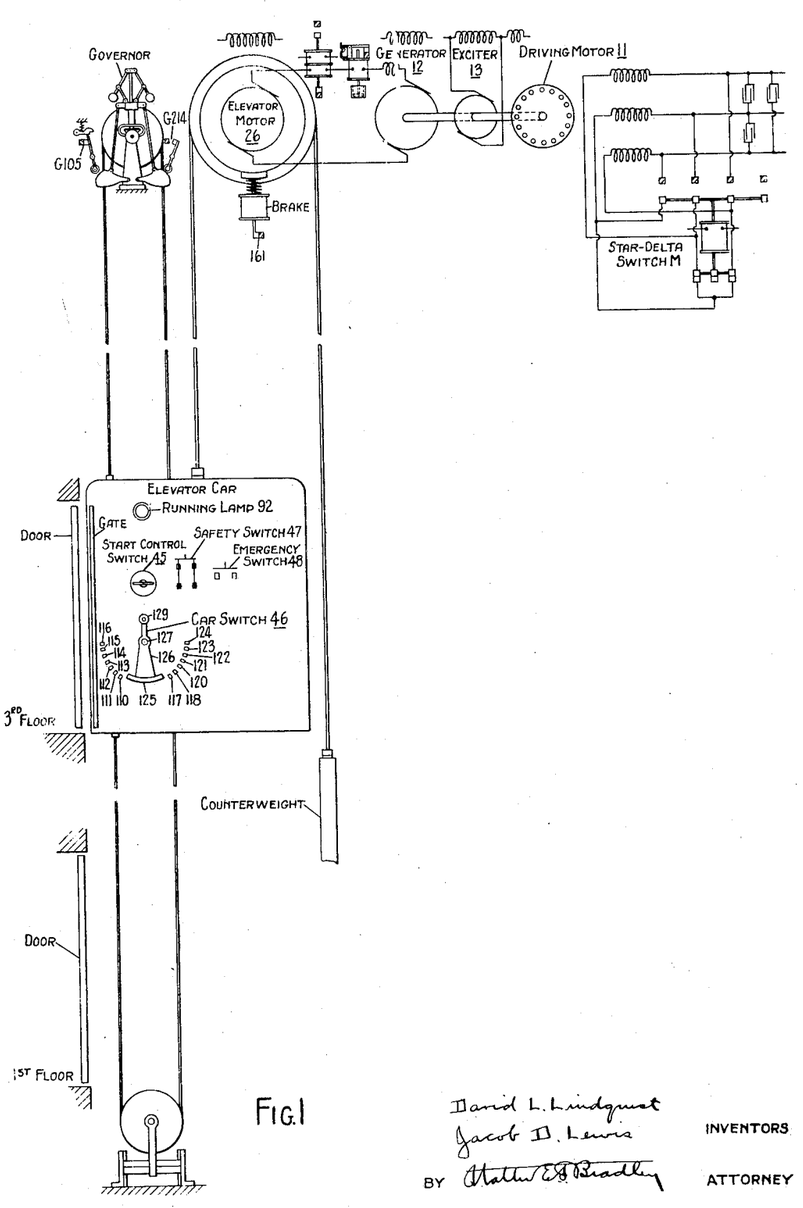
Figure 1 is a schematic representation of an elevator system.

For a general understanding of the invention, reference may be had to Figure 1 wherein various parts of the system are indicated by legend. The elevator car and counterweight are raised and lowered by means of the elevator motor. This motor receives its power from the generator of the motor-generator set. The driving motor for the generator, illustrated as a three phase induction motor of the squirrel cage type, also drives an exciter. This exciter is for supplying direct current to the separately excited field windings of the generator and elevator motor and to certain of the control circuits. The driving motor is started and stopped by means of a start control switch arranged in the car. The starting and stopping of the elevator motor, and therefore of the elevator car, is controlled by a car switch in the car. This switch is also employed to cause the change in connections of the stator phase windings of the driving motor from star to delta relation, acting through the intermediary of an electromagnetic switch hereinafter termed the star-delta switch. A safety switch is provided in the car for stopping the car in the event of an emergency. An emergency switch is provided in the car for operating the car with the car gate and hatchway doors open. The brake is employed to bring the elevator motor to a stop. The governor causes the operation of the governor switch to effect certain control operations. A lamp is arranged in the car which, when lighted, indicates that the motor-generator set is in operation. This lamp may be termed the running lamp.

Figure 2:
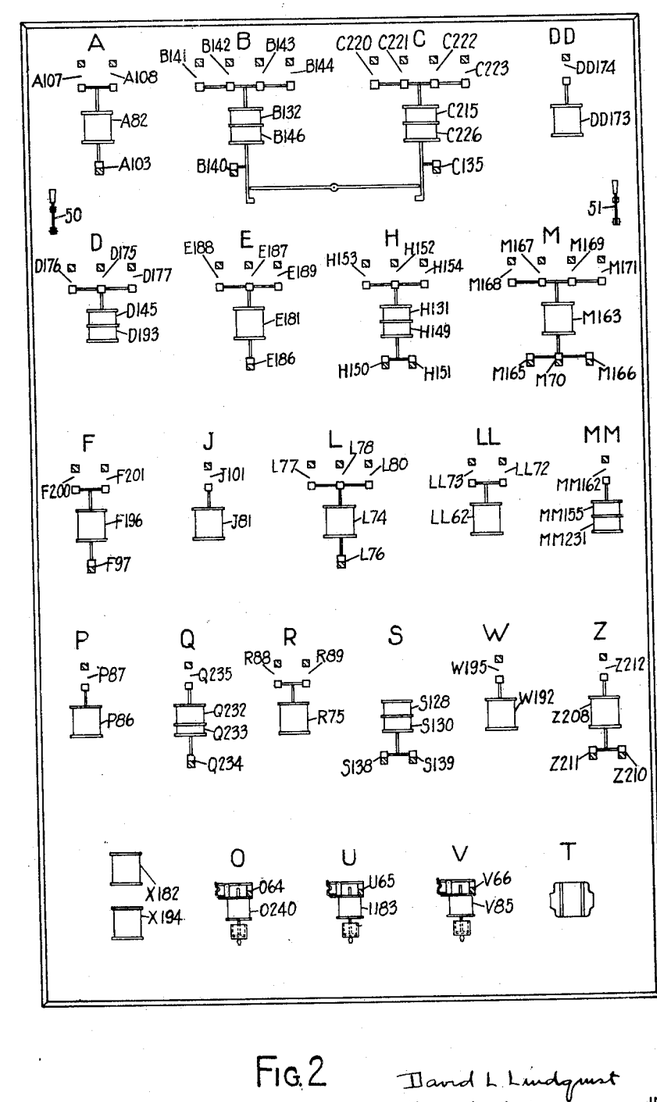
Figure 2 is a diagrammatic representation of the control panel, showing particularly the relation of the coils and contacts of the electromagnetic switches.
Figure 3:
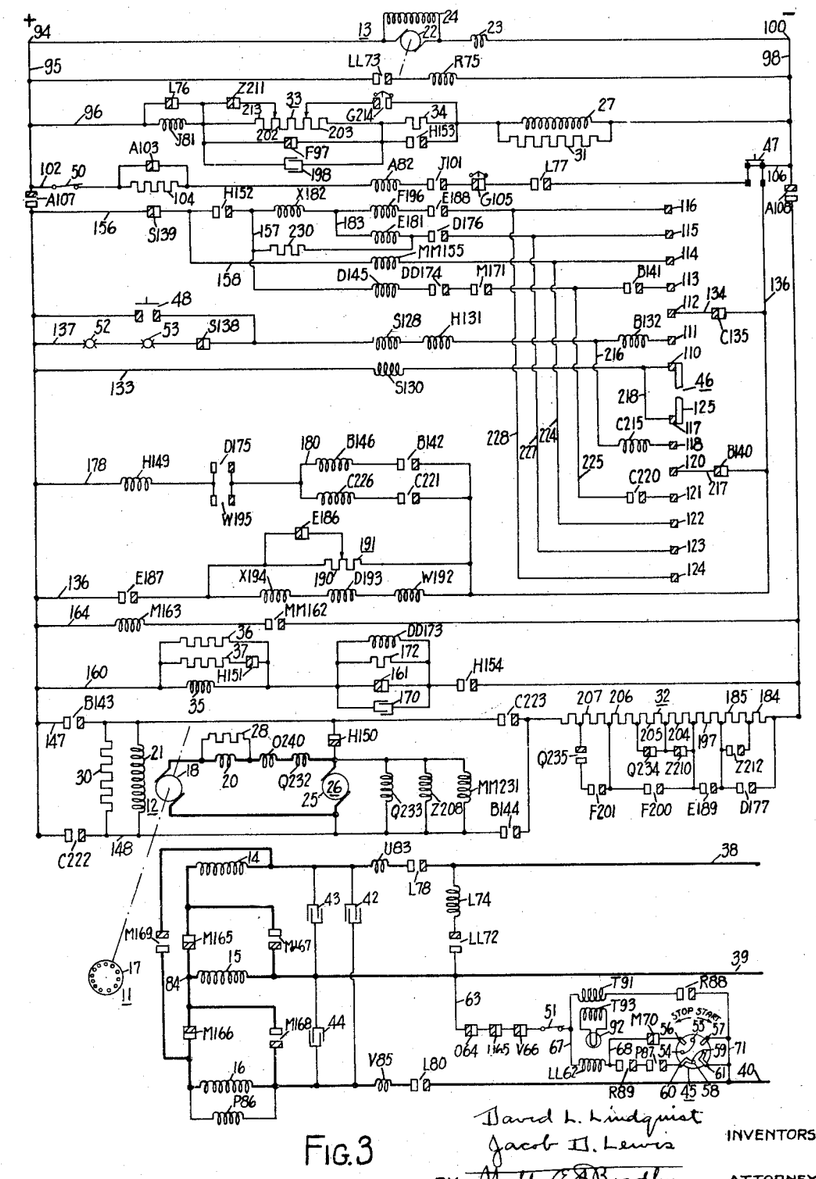
Figure 3 is a simplified diagram of the elevator control system.

Referring to Figure 3, no attempt is made to show the coils and contacts of the various electromagnetic switches in their associated positions, a "straight" diagram being employed wherein the coils and contacts of these switches are separated in such manner as to render the circuits involved relatively simple. Also, the parts of other switches and apparatus are separated in the interest of simplifying the diagram. For a clearer understanding of the diagram, the stationary contacts of the switches are illustrated in cross section. The relation of the coils and contacts of the various switches may be seen upon reference to Figure 2.

The electromagnetic switches have been designated as follows:

A—potential switch
B—up direction switch
C—down direction switch
DD—accelerating relay
D—first accelerating switch
E—second accelerating switch
F—third accelerating switch
H—brake and field switch
J—minimum current field relay
L—driving motor line switch
LL—driving motor starting relay
M—star-delta switch
MM—star-delta relay
O—generator overload relay
P—protective relay
Q—load switch
R—running relay
S—sequence relay
U—driving motor overload relay No. 1
V—driving motor overload relay No. 2
W—maintaining relay
Z—speed control switch Throughout the description which follows, these letters, in addition to the usual reference numerals, will be applied to the parts of the above enumerated switches. For example, contacts B 143 are contacts on the up direction switch, while actuating coil A 82 is the coil that operates the potential switch.

The electromagnetic switches are shown in their deenergized positions. Other switches and apparatus are similarly designated as follows:

G—governor switch
T—transformer
X—inductance coils

The alternating current driving motor of the motor-generator set is designated as a whole by the numeral 11. The generator of the motor-generator set is a variable voltage direct curent generator and is designated as a whole by the numeral 12. The exciter, also driven by the driving motor, is designated as a whole as 13. The phase windings of the stator of the driving motor are designated 14, 15 and 16 and the rotor is designated 17. The armature of the generator is designated 18, its series field winding 20 and its separately excited field winding 21. The armature of the exciter is designated 22, its series field winding 23 and its shunt field winding 24. In order to indicate the driving relation, a dot and dash line is extended from the rotor of the driving motor to the armatures of the generator and exciter, this line being broken off between the generator and exciter armatures to avoid confusion in the control circuits. The generator supplies current to the armature 25 of the elevator motor 26. The elevator motor has a separately excited field winding 27. The exciter 13 is employed to supply current for the separately excited field windings of the generator and elevator motor and also for the control circuits other than those supplied by the alternating current power mains. A resistance 28 is arranged in shunt to the generator series field winding and a discharge resistance 30 is provided for the generator separately excited field winding. A discharge resistance 31 is provided also for the elevator motor separately excited field winding. A resistance 32 is provided for controlling the strength of the generator field and therefore the voltage applied to the elevator motor armature. Resistances 33 and 34 are arranged in series with the elevator motor separately excited field winding. The release coil for the electromagnetic brake is designated 35. This coil is provided with discharge resistances 36 and 37. The alternating current power mains are designated 38, 39 and 40. Condensers 42, 43 and 44 are connected across these mains to improve the power factor. 45 is the start control switch in the car employed to start the motor-generator set in operation. The car switch is designated as a whole by the numeral 46. 47 is the safety switch in the car while 48 is the emergency switch, also in the car. 50 and 51 are knife switches arranged on the control panel. The contacts controlled by the gate are designated 52 while the contacts controlled by the various doors are indicated as a single pair of contacts and designated 53. Various safety, limit, terminal stop and emergency switches are omitted in order to simplify the description. Other apparatus will be referred to as the description proceeds.

It will be assumed that control switches 50 and 51 are closed. In order to start the driving motor in operation, the start control switch in the car is turned clockwise to start position, causing the bridging contacts 54 and 55 to engage contacts 56 and 57. It is to be noted that bridging contacts 58 and 59 remain in engagement with contacts 60 and 61 with the start control switch in start position. The bridging of contacts 56 and 57 completes a circuit for the actuating coil LL 62 of the driving motor starting relay. This circuit may be traced from power main 39, by way of line 63 through contacts O 64 of the generator overload relay, contacts U 65 and V 66 of the driving motor overload relays and control switch 51, by way of line 67 through coil LL 62, by way of line 68 through contacts M 70 of the star-delta switch and bridged contacts 56 and 57, line 71, to power main 40. This relay operates to cause the engagement of its contacts LL 72 and LL 73. Contacts LL 72, upon their engagement, connect the actuating coil L 74 of the driving motor line switch across power mains 38 and 39. Contacts LL 73, upon their engagement, connect the actuating coil R 75 of the running relay to the terminals 94 and 100 of the exciter 13. The operation and purpose of the running relay will be explained later.

The driving motor line switch L, operating as a result of the energization of its actuating coil L 74, causes the separation of its contacts L 76 and the engagement of its contacts L 77, L 78 and L 80. The separation of contacts L 76 removes the short circuit from around coil J 81 of the minimum current field relay. The engagement of contacts L 77 prepares the circuit for the actuating coil A 82 of the potential switch. The engagement of contacts L 78 and L 80 connects the driving motor stator phase windings 14 and 16 to power mains 38 and 40 respectively. The other phase winding 15, being connected to power main 39, the engagement of contacts L 78 and L 80 completes the circuits for the driving motor stator phase windings. The circuits for the driving motor stator phase windings may be traced as follows: Power main 38, through contacts L 78, driving motor overload relay coil U 83, phase winding 14 and contacts M 165 of the star-delta switch, to Y point 84; power main 39, through phase winding 15, to Y point 84; and power main 40, through contacts L 80, driving motor overload relay coil V 85, phase winding 16 and contacts M 166 of the star-delta switch, to Y point 84; It is to be noted that the stator phase windings of the driving motor are connected in star relation. Contacts L 80 also complete the circuit for the actuating coil P 86 of the protective relay. This relay, upon operation, causes the engagement of its contacts P 87 to prepare a holding circuit for coil LL 62.

The stator windings of the driving motor being energized, this motor starts in operation, driving the armatures of generator 12 and exciter 13. The E. M. F. of the exciter builds up as the driving motor speed increases. Upon a predetermined value of exciter E. M. F. being attained, the running relay R operates, the actuating coil R 75 of this relay being connected across the exciter terminals as explained before. Relay R causes the engagement of its contacts R 88 and R 89. Contacts R 89, upon engagement, complete the holding circuit for starting relay coil LL 62, this circuit being by way of line 67, from its junction point with line 68, through contacts R 89, contacts P 87 and bridged contacts 60 and 61 of the start control switch, to line 71. Contacts R 88, upon engagement, complete the circuit for the primary winding T 91 of the lighting transformer. The running lamp 92 is arranged across the secondary winding T 93 of this transformer, this lamp being lighted as a result of the energization of the primary winding T 91. Lamp 92 is arranged in the elevator car, as previously explained, and is positioned to be readily visible to the car operator or other person manipulating the start control switch (see Figure 1). The lighting of this lamp indicates that the motor-generator set is in operation. Thus, with the lamp lighted, the start control switch may be released, this switch being biased to off position, i. e., the position illustrated, as by a spring (not shown). It is to be noted that start control switch contacts 60, 61 remain bridged with the switch in off position. Thus, the holding circuit for coil LL 62 remains completed.

The E. M. F. of the exciter builds up to its full value as the driving motor comes up to full speed. As stated previously, the exciter supplies current for field winding 27 of the elevator motor. According to the preferred arrangement, however, with the motor-generator set running but with the elevator motor at rest, this current is reduced, providing what may be termed a "standing field". Resistance 34 is employed for this purpose. The circuit for the elevator motor separately excited field winding may be traced from the left-hand (+) exciter terminal 94, line 95, by way of line 96 through coil J 81, contacts F 97, by-passing resistance 33, resistance 34 and field winding 27, line 98, to the right-hand (−) exciter terminal 100. It is not desired to apply full exciter voltage to field winding 27 when the elevator motor is not in operation because of increased power consumption. On the other hand, it is not desired to have this winding deenergized with the elevator motor at rest as a matter of safety and because of the time constant involved in building up.

As previously explained, contacts L 76 separate to remove the short circuit for coil J 81 of the minimum current field relay upon the connection of the driving motor to the power mains, coil J 81 being connected in series with the elevator motor field winding 27 as seen from the circuit above traced. This relay, however, does not operate immediately, its operation being delayed owing to the fact that the time constant of the field winding delays the building up of the current supplied to its actuating coil. As soon as the elevator motor field builds up substantially to full "standing field" value, relay J operates to cause the engagement of contacts J 101, completing the circuit for coil A 82 of the potential switch. This circuit may be traced from terminal 94, line 95, by way of line 102 through switch 50, potential switch contacts A 103, by-passing the potential switch actuating coil cooling resistance 104, coil A 82, contacts J 101, contacts G 105 of the governor switch and contacts L 77, safety switch 47, line 106, line 98, to terminal 100. Thus, the circuit for coil A 82 cannot be completed and therefore the potential switch cannot operate until the elevator motor field has built up to substantially full "standing field" value. By this arrangement, injury to the system such as would result from dangerous speeds of the elevator motor is prevented. In order that this may be clearly seen, assume that the system is not provided with relay J and contacts L 76. Upon starting up, the elevator motor field, due to its large time constant, builds up more slowly than the E. M. F. of the exciter. Thus, the potential switch would operate before the elevator motor field built up and, if the operator has thrown the car switch into position to start the car immediately after starting the driving motor, the elevator motor would start on a weak field and tend to run away. By providing the system with the minimum current field relay J, starting the elevator motor on a weak field in this manner is prevented since the motor field current must be built up to substantially full "standing field" value to effect the operation of the relay. Contacts L 76 cause the immediate dropping out of relay J upon the movement of the start control switch to stop position to shut down the motor-generator set. When such shut down occurs, the current in the elevator motor field winding reduces slowly due to the time constant of the field and also to the fact that the exciter voltage reduces slowly. Without contacts L 76, therefore, the current in coil J 81 also would reduce slowly. Furthermore, coil J 81 may cause relay J to hold in at a considerably lower voltage than that at which the relay operates. Relay J, therefore, would hold in for a time after the driving motor was disconnected from the mains. Thus, should the driving motor be started in operation again and the car switch moved into a position to start the car before relay J dropped out to separate contacts J 101, again the elevator motor might be caused to operate on a weak field. With contacts L 76 provided, however, their engagement short-circuits coil J 81 and therefore effects the separation of contacts J 101 immediately the start control switch is moved to stop position. Contacts J 101 thereafter remain separated, as above explained, until the elevator motor field has built up to substantially "standing field" value. Thus, the starting of the driving motor on a weak field in the above described manner is prevented.

Assuming then that contacts J 101 are closed and that coil A 82 is energized, the potential switch operates to cause the engagement of contacts A 107 and A 108 and the separation of contacts A 103. The engagement of contacts A 107 and A 108 prepares the circuit for the generator separately excited field winding and the remaining control circuits supplied by the exciter. The separation of contacts A 103 inserts the cooling resistance 104 in series with the potential switch actuating coil A 82. Assuming that the above described operations have been completed, the system is now in "normal" operating condition, i. e., ready for starting the car.

The motor-generator set runs idle until the car is started. During the idling period, the phase windings of the driving motor are connected in star relation to the mains so that the magnetizing current is small and the power factor is high. Condensers 42, 43 and 44 are connected across the mains and are of a capacity to bring the power factor to the desired value under these conditions. Owing to the fact that the magnetizing current is small when the phase windings are connected in star relation, these condensers are but a fraction of the size that would be required to bring the power factor to the same value were these windings connected in delta.

The car is started by moving the car switch 46 into one of its operative positions, depending upon the direction of travel desired. Referring briefly to Figure 1, the car switch comprises a set of up contacts 110, 111, 112, 113, 114, 115 and 116 and a set of down contacts 117, 118, 120, 121, 122, 123 and 124. A contact segment 125 for bridging the contacts of each set is mounted on the segmental support 126 of insulating material. The switch is pivoted at 127 and is operated by means of a control handle 129. It is preferred to provide centering springs (not shown) on the car switch to cause it to be returned to off position when released by the operator.

Referring back to Figure 3, assume that the car is at rest at the first floor with the car gate and first floor hatchway door closed. Thus, gate contacts 52 and door contacts 53 are in engagement. The operator may now move the car switch to full operated position to start the car in the up direction. Upon the engagement of contact segment 125 with feed contact 112, circuits are simultaneously completed for the oppositely wound coils S 128 and S 130 of the sequence relay, actuating coils H 131 of the brake and field switch and B 132 of the up direction switch being in the circuit for coil S 128. The engagement of the contact segment and contacts 113, 114, 115 and 116 prepares circuits for the actuating coils of the accelerating switches and star-delta relay.

The circuit for coil S 130 of the sequence relay may be traced from terminal 94, by way of line 95 through contacts A 107, by way of line 133 through coil S 130, contacts 110 and 112 of the car switch, by way of line 134 through contacts C 135 of the down direction switch, line 136, safety switch 47, line 106, line 98, to terminal 100. The circuit for coil S 128 may be traced from terminal 94, by way of line 95 through contacts A 107, by way of line 137 through gate contacts 52, door contacts 53, sequence relay contacts S 138, coil S 128, coil H 131 and coil B 132, contacts 111 and 112 of the car switch, to terminal 100 as above traced. The purpose of sequence relay S is to insure the closure of the gate and doors before starting the car. Coils S 128 and S 130, being differentially wound, oppose each other, when energized simultaneously, to prevent the operation of the relay. If either coil is energized ahead of the other, or if either coil alone is energized, contacts S 138 separate, preventing the starting of the car. If either gate contacts 52 or any of the door contacts 53 are separated at the time that car switch segment 125 engages feed contact 112, coil S 130 alone is energized, resulting in the separation of contacts S 138. The separation of these contacts prevents the energization of coil S 128, maintaining the sequence relay operated, and of coils B 132 and H 131, preventing the operation of the up direction switch and brake and field switch to effect the starting of the car. Thus, it is impossible to start the car on the door or gate contacts. The sequence relay is provided with additional contacts S 139, the purpose of which will be explained later.

Assuming that the sequence relay has operated, in order to start the car, the car switch is returned to off position. The disengagement of segment 125 from feed contact 112 deenergizes coil S 130 to permit the reengagement of contacts S 138. If the gate and door are closed, the car switch may be returned immediately to full on position. Otherwise, the closing of the gate and door must be effected before the car switch is moved into full on position.

It is preferred to provide the main direction switches with a mechanical interlock to prevent their simultaneous operation. Such an interlock may be of the form of a walking beam pivotally mounted for engaging catches on the armatures of these switches. Upon operation of the up main direction switch in response to the energization of its actuating coil B 132, contacts B 140 separate and contacts B 141, B 142, B 143 and B 144 engage. The separation of contacts B 140 breaks the circuit from the down feed contact 120 to line 98, contacts B 140 and the corresponding down direction switch contacts C 135 serving as electrical interlocks. The engagement of contacts B 141 prepares the circuit for the actuating coil D 145 of the first accelerating switch. The engagement of contacts B 142 prepares a circuit for the holding coil B 146 of the up direction switch and the holding coil H 149 of the brake and field switch. The engagement of contacts B 143 and B 144 completes the circuit for the generator separately excited field winding 21. This circuit may be traced from terminal 94, by way of line 95 through contacts A 107, by way of line 147 through contacts B 143, through field winding 21, by way of line 148 through contacts B 144, back to line 147, to the right through resistance 32, by way of line 98 through contacts A 108, to terminal 100.

The brake and field switch H operates simultaneously with the direction switch B. Switch H, upon operation, causes the separation of contacts H 150 and H 151 and the engagement of contacts H 152, H 153 and H 154. The separation of contacts H 150 disconnects the generator separately excited field winding 21 from the generator armature. The purpose of this arrangement will be described later. The separation of contacts H 151 disconnects resistance 37 from across the brake release coil 35. Resistance 37 being of low ohmic value, its disconnection before contacts H 154 engage prevents excess power consumption from exciter 13. The engagement of contacts H 152 further prepares the circuits for the actuating coils of the accelerating switches. The engagement of contacts H 153 short-circuits resistance 34 in circuit with the elevator motor field winding 27, permitting the motor field to build up to its full strength. The engagement of contacts H 154 completes the circuit for the brake release coil 35. This circuit may be traced from terminal 94, by way of line 95 through contacts A 107, by way of line 160 through coil 35 and contacts 161, operated by the brake, and contacts H 154, by way of line 98 through contacts A 108, to terminal 100.

The brake release coil 35 being energized, the elevator motor field winding being connected directly to the exciter 13 and current being supplied from the generator armature 18 to the elevator motor armature 25, due to the energization of the generator separately excited field winding, the elevator motor starts.

The circuit for the star-delta relay actuating coil MM 155 is completed by the engagement of car switch segment 125 with contact 114. This circuit may be traced from terminal 94, by way of line 95 through contacts A 107, by way of line 156 through contacts S 139, by way of line 158 through coil MM 155, car switch contacts 114 and 112, to terminal 100 as previously traced. This relay, upon operation, causes the engagement of its contacts MM 162, completing the circuit for the star-delta switch actuating coil M 163. The circuit for this coil may be traced from terminal 94, by way of line 95 through contacts A 107, by way of line 164 through coil M 163 and contacts MM 162, by way of line 98 through contacts A 108, to terminal 100. Switch M, upon operation, causes the separation of contacts M 70, M 165 and M 166 and the engagement of contacts M 167, M 168, M 169 and M 171. The purpose of contacts M 70 will be explained later. The separation of contacts M 165 and M 166 and the engagement of contacts M 167, M 168 and M 169 change the connections for the phase windings of the driving motor from star to delta relation, phase winding 14 being connected across power mains 38 and 39, phase winding 15 across power mains 39 and 40 and phase winding 16 across power mains 38 and 40. Thus, upon connections being made to cause the starting of the elevator motor, the phase windings of the driving motor of the motor-generator set are changed from start to delta connection, provided the car switch segment 125 has been moved far enough to cause the energization of the actuating coil MM 155 of the star-delta relay. Contacts M 171, upon engagement, further prepare the circuit for the actuating coil D 145 of the first accelerating switch.

As the brake releases, the brake switch contacts 161 separate to insert cooling resistance 172 in series with the brake release coil, condenser 170 being provided across contacts 161 to prevent the drawing of an arc. These brake switch contacts are preferably arranged to be separated at the end of the releasing operation (see Figure 1). The separation of these contacts also breaks the short circuit around coil DD 173, permitting the operation of the accelerating relay DD. This relay operates to cause the engagement of its contacts DD 174, completing the circuit for the first accelerating switch actuating coil D 145. The purpose of this arrangement is to utilize the time constant of the brake for timing the acceleration of the elevator motor, more specifically, for timing the operation of the first accelerating switch. Although the brake release coil is energized at the same time that power is supplied to the motor, the brake shoes do not lift at once because of the inherent time constant of the brake magnet and because the brake shoes and lever arms and other moving parts of the brake represent considerable mass to be set in motion. The circuit for coil D 145 completed by contacts DD 174 may be traced from terminal 94, by way of line 95 through contacts A 107, by way of line 156 through contacts S 139 and contacts H 152, by way of line 157 through coil D 145, contacts DD 174, contacts M 171 and contacts B 141, car switch contacts 113 and 112, to terminal 100 as previously traced.

The first accelerating switch D, upon operation, causes the engagement of its contacts D 175, D 176 and D 177. The engagement of contacts D 175 completes the circuit for holding coils B 146 and H 149 of the up direction switch and brake and field switch respectively. This circuit may be traced from terminal 94, by way of line 95 through contacts A 107, by way of line 178 through coil H 149 and contacts D 175, by way of line 180 through coil B 146 and contacts B 142, line 136, to terminal 100 as previously traced. The purpose of the energization of these holding coils will be seen from later description. The engagement of contacts D 176 completes the circuit for the second accelerating switch actuating coil E 181. This circuit may be traced from terminal 94, by way of line 95 through contacts A 107, by way of line 156 through contacts S 139, contacts H 152 and inductance coil X 182, by way of line 183 through coil E 181 and contacts D 176, contacts 115 and 112 of the car switch, to terminal 100 as previously traced. The engagement of contacts D 177 short-circuits sections 184 and 185 of resistance 32, increasing the voltage applied to the generator field winding. Thus, the generator E. M. F. is increased, increasing the speed of the elevator motor.

The second accelerating switch E does not operate immediately the circuit for its actuating coil is completed, its action being delayed by the effect of inductance coil X 182. Upon operation, contacts E 186 separate and contacts E 187, E 188 and E 189 engage. The separation of contacts E 186 breaks the short circuit around portion 190 of resistance 191, this resistance being arranged in shunt to actuating coil W 192 of the maintaining relay, holding coil D 193 of the first accelerating switch and inductance coil X 194. The separation of contacts E 186 before contacts E 187 engage prevents excess power consumption from exciter 13. The engagement of contacts E 187 completes the circuit for coils W 192 and D 193, this circuit being from terminal 94, by way of line 95 through contacts A 107, by way of line 136 through contacts E 187, inductance coil X 194, coil D 193 and coil W 192, to terminal 100 as previously traced. The maintaining relay, operating as a result of the energization of its actuating coil, causes the engagement of its contacts W 195 to by-pass contacts D 175 in the circuit for holding coils B 146 and H 149. The purpose of this arrangement will be explained later. The engagement of contacts E 188 completes the circuit for the actuating coil F 196 of the third accelerating switch, this circuit being from terminal 94, by way of line 95 through contacts A 107, by way of line 156 through contacts S 139, contacts H 152, inductance coil X 182, coil F 196 and contacts E 188, contacts 116 and 112 of the car switch, to terminal 100 as previously traced. The engagement of contacts E 189 short-circuits section 197 of resistance 32 to increase the voltage applied to the generator field winding. Thus, the generator E. M. F. is further increased, increasing the speed of the elevator motor.

The third accelerating switch does not operate immediately the circuit for its actuating coil is completed, its action also being delayed by the effect of inductance coil X 182. Upon operation, contacts F 97 separate and contacts F 200 and F 201 engage. Contacts F 97, upon separation, remove the short circuit for sections 202 and 203 of resistance 33 in circuit with the elevator motor field winding. A condenser 198 is arranged in shunt to contacts F 97 to prevent an arc being drawn when these contacts separate. The engagement of contacts F 200 short-circuits section 206 of resistance 32 in circuit with the generator field winding, it being noted that the short circuit extends in addition across resistance sections 204 and 205. The removal of the short circuit for sections 202 and 203 of resistance 33 and the short-circuiting of section 206 of resistance 32 cause respectively the weakening of the elevator motor field and the strengthening of the generator field, thus again increasing the speed of the elevator motor. The engagement of contacts F 201 prepares the circuit for short-circuiting section 207 of resistance 32.

The actuating coil Z 208 of the speed control switch is connected to the generator armature 18, this switch operating when the generator E. M. F. has built up substantially to full value to cause the separation of contacts Z 210 and Z 211 and the engagement of contacts Z 212. The purpose of contacts Z 210 and Z 212 will be explained later. The separation of contacts Z 211 removes the short circuit for the remaining section 213 of resistance 33 in the elevator motor field winding circuit, bringing the elevator motor up to full speed.

Should the elevator motor, from any cause, overspeed above a certain amount, contacts G 214 of the governor switch engage to short-circuit section 203 of resistance 33 in the elevator motor field winding circuit. Thus, the voltage applied to the motor field winding is increased, causing the motor to slow down. It is to be noted that governor switch contacts G 214 are connected outside of resistance 34. Thus, resistance 34, as well as resistance section 203, is short-circuited by the engagement of contacts G 214, affording protection of the elevator motor against dangerous overspeed due to faulty engagement of contacts H 153. The governor and governor switch operated thereby are illustrated in Figure 1.

The starting of the elevator car in the down direction is accomplished in a similar manner and will be only briefly described. The door and gate are first closed and then the car switch is moved into full down operated position where its contact segment 125 bridges contacts 117, 118, 120, 121, 122, 123 and 124. Thus, the circuits are completed for coils S 128, S 130 and H 131 and the actuating coil C 215 of the down direction switch. The circuit for coils S 128 and H 131 and C 215 may be traced from terminal 94 through coils S 128 and H 131 as previously traced, by way of line 216 through coil C 215, car switch contacts 118 and 120, by way of line 217 through contacts B 140, line 136, to terminal 100 as previously traced. The circuit for coil S 130 is by way of line 218. The down direction switch, upon operation, causes the separation of contacts C 135 and the engagement of contacts C 220, C 221, C 222 and C 223, these contacts corresponding with up direction switch contacts B 140, B 141, B 142, B 143 and B 144 respectively. The circuit for coil MM 155 of the star-delta relay is completed by the engagement of car switch segment 125 and contact 122 and is by way of line 224. The circuit for coil D 145 of the first accelerating switch is completed, as before, by the engagement of contacts DD 174, this circuit being by way of line 225. First accelerating switch contacts D 175, upon engagement, complete the circuit for holding coil H 149 of the brake and field switch and holding coil C 226 of the down direction switch through contacts C 221. The circuit for the second accelerating switch actuating coil E 181, completed by contacts D 176, is by way of line 227 and the circuit for the third accelerating switch actuating coil F 196, completed by contacts E 188, is by way of line 228. Further than this, the operation of starting the car in the down direction is the same as described for starting it in the up direction.

Assume that the car is running in the up direction and that the operator centers the car switch between the second and third floors to stop at the third floor landing. Thus, the contact segment 125 moves off contacts 116, 115, 114, 113, 112 and 111, and the circuits for the third accelerating switch actuating coil F 196, second accelerating switch actuating coil E 181, star-delta relay actuating coil MM 155, first accelerating switch actuating coil D 145, up direction switch actuating coil B 132, brake and field switch actuating coil H 131 and sequence relay coils S 128 and S 130 are broken. The third accelerating switch drops out immediately. The dropping out of the second accelerating switch, star-delta relay, first accelerating switch, up direction switch and brake and field switch, however, is delayed, as will be explained later. The deenergization of coils S 128 and S 130 is in preparation for the next starting operation.

The third accelerating switch, upon dropping out, causes the separation of contacts F 200 and F 201 and the reengagement of contacts F 97. The purpose of contacts F 201 will be explained along with the description of the operation of load switch Q, it being assumed for purposes of the present description that switch Q is not operated. The separation of contacts F 200 reinserts sections 206 and 204 in circuit with the generator field winding 21 to decrease the generator E. M. F., contacts Z 210 being separated as previously explained. The engagement of contacts F 97 short-circuits sections 202, 203 and 213 of resistance 33, increasing the strength of the elevator motor field for the stopping operation. By providing contacts on both the speed control switch Z and on the third accelerating switch F for controlling resistance 33, in the starting operation the strength of the elevator motor field is not decreased to full speed running value until the generator E. M. F. has built up substantially to full value, while in the stopping operation the strength of the elevator motor field is increased immediately the stopping operation is initiated. The generator E. M. F. being lowered and the strength of the elevator motor field being increased, the speed of the elevator motor is lowered.

The dropping out of the second accelerating switch E is delayed by the action of inductance coil X 182 in series with its coil E 181 and discharge resistance 230 in parallel with its coil and the inductance coil. Upon dropping out, switch E causes the separation of contacts E 187, E 188 and E 189 and the engagement of contacts E 186. The separation of contacts E 188 is in preparation for the next starting operation, the circuit for coil F 196 having been broken by the disengagement of car switch segment 125 from contact 116. The separation of contacts E 189 reinserts resistance section 197 in circuit with the generator field winding. Thus, the generator E. M. F. is again lowered and the speed of the elevator motor further reduced. The separation of contacts E 187 breaks the circuit for maintaining relay actuating coil W 192 and for the holding coil D 193 of the first accelerating switch, the circuit for the first accelerating switch actuating coil D 145 having been broken by the disengagement of car switch segment 125 from contact 113. The first accelerating switch and maintaining relay do not drop out immediately, however, their action being delayed by the effect of inductance coil X 194 in series with coils D 193 and W 192 and discharge resistance 191 in parallel with these coils and the inductance coil. The engagement of contacts E 186 to short-circuit portion 190 of resistance 191 is effective to prolong the time element of the switch and relay. This time element may be adjusted to the desired value by changing the amount of the resistance portion short-circuited. Relay W is preferably arranged to hold in at a smaller current value than the accelerating switch D. This may be readily accomplished as by employing a relay which is smaller than switch D and lighter in construction, thus requiring less current to hold in.

The first accelerating switch, upon dropping out, causes the separation of contacts D 175, D 176 and D 177. The separation of contacts D 175 is in preparation for the next starting operation, contacts W 195 being maintained in engagement by relay W to sustain the energization of holding coils B 146 and H 149 of the up direction switch and brake and field switch respectively. The separation of contacts D 176 also is in preparation for the next starting operation, the circuit for coil E 181 having been broken by the return of the car switch to off position. The separation of contacts D 177 removes the short circuit for section 184 of resistance 32, further decreasing the E. M. F. of the generator and therefore the speed of the elevator motor. Resistance section 185 is not reinserted in the generator field winding circuit at this time due to the fact that contacts Z 212 are maintained closed until after switch D drops out, the actuating coil Z 208 of the speed control switch acting to maintain the switch operated at a lower voltage than that applied to cause the operation of the switch.

The maintaining relay W, upon dropping out, causes the separation of its contacts W 195, breaking the circuit for holding coils B 146 and H 149. As a result, the up direction switch B and brake and field switch H drop out. Switch B, upon dropping out, causes the separation of contacts B 141, B 142, B 143 and B 144 and the reengagement of contacts B 140. The reengagement of contacts B 140 is in preparation for the next starting operation, these contacts, along with contacts C 135, serving as electrical interlocks as previously explained. The separation of contacts B 141 and of contacts B 142 also is in preparation for the next starting operation, the circuit for coil D 145 having been broken at the car switch and the circuit for coils B 146 and H 149 having been broken by contacts W 195 as previously explained. The separation of contacts B 143 and B 144 disconnects the generator separately excited field winding from the exciter 13. Switch H, dropping out along with switch B, causes the separation of contacts H 152, H 153 and H 154 and the reengagement of contacts H 150 and H 151. The separation of contacts H 152 is in preparation for the next starting operation, the circuits for the actuating coils of the accelerating switches having been broken by the car switch. The separation of contacts H 154 breaks the circuit for the brake release coil 35, effecting the application of the brake. The engagement of contacts H 151 reconnects resistance 37 across the brake release coil, causing a "soft" application of the brake. The separation of contacts H 154 also breaks the circuit for coil DD 173 of the accelerating relay, this coil being thereafter short-circuited by the reengagement of the contacts 161 of the brake switch. The accelerating relay, therefore, drops out, causing the separation of its contacts DD 174. The separation of these contacts is in preparation for the next starting operation, the circuit for coil D 145 having previously been broken by the return of the car switch to off position. The separation of contacts H 153 reinserts resistance 34 in series with the elevator motor field winding, reducing the current therein to a "standing field" value. The reengagement of contacts H 150 reconnects the generator field winding 21 to the generator armature. The polarity of this connection is such that the generator sends current through its field winding in such manner as to oppose the flux which produces the generator E. M. F., thus tending to destroy the residual flux of the generator field.

Thus, the brake being applied and the generator separately excited field winding being disconnected from the exciter, the elevator car is brought to a stop. It is believed that the stopping of the car, when it is traveling in the down direction, will be obvious from previous description and such operation will not be described.

It is preferred to maintain the star-delta relay in operated condition after the circuit for its actuating coil MM 155 is broken by the return of the car switch to off position. This may be accomplished by providing this relay with a holding coil. This holding coil, designated MM 231, may be connected to the armature of the generator and thus rendered subject to the generator E. M. F. With such arrangement, the star-delta relay may be maintained operated during stopping until the generator E. M. F. decreases to a predetermined value. The value of generator E.M.F. at which this relay drops out depends upon the characteristics of the machines employed and the requirements of the particular installation, it having been found in certain installations that satisfactory operation is obtained by permitting relay MM to drop out under average load conditions just prior to the dropping out of the direction switch. Relay MM, upon dropping out, causes the separation of its contacts MM 162 to break the circuit for actuating coil M 163 of the star-delta switch. Switch M, upon dropping out, causes the separation of its contacts M 167, M 168, M 169 and M 171 and the engagement of its contacts M 70, M 165 and M 166. The purpose of contacts M 70 will be explained later. The separation of contacts M 171 is in preparation for the next starting operation, the circuit for coil D 145 having been broken by the return of the car switch to off position, as previously explained. The separation of contacts M 167, M 168 and M 169 and the reengagement of contacts M 165 and M 166 change the connections for the phase windings of the driving motor from delta back to star relation. Thus, during the time that the elevator car is stopped, the driving motor runs star connected.

The system is arranged so that the driving motor runs with its phase windings connected star also during inching. In order that this may be clearly seen, it will be assumed that the car, in the above chosen example, stops short of the third floor landing. To inch up to the floor, the operator moves the car switch into position where segment 125 engages feed contact 112. As a result, the up-direction switch and brake and field switch are operated to cause the elevator motor to run at slow speed in the up direction. It is to be noted that contact 113 intervenes between feed contact 112 and contact 114 for star-delta relay coil MM 155. Such arrangement provides considerable inching range on the car switch and this eliminates any great amount of skill on the part of the operator to obtain inching speed. It is to be further noted that with the system as arranged, the elevator motor cannot be accelerated beyond inching speed without changing over the connections for the phase windings from star to delta. This is due to the fact that contacts M 171 of the star-delta switch are arranged in the circuit for coil D 145 and thus prevent the operation of the first accelerating switch when the phase windings of the driving motor are star connected.

In order to obtain proper speed regulation for various load conditions, it is prefered to adjust the series field of the generator to give proper compounding for starting and stopping. This may be obtained by employing the proper value of resistance 28 in shunt to the generator series field winding 20. The generator field resistance and elevator motor field resistance are then adjusted so that, upon engagement of contacts F 200 and the separation of contacts F 97 and Z 211, the car runs at the desired speed for lowering a load, i. e., light load up or full load down. In order to obtain the desired speed when lifting a load, i. e., full load up or light load down, an additional step of resistance in the circuit of the generator field winding is short-circuited. The operation of cutting out the additional step of resistance may be effected by means of contacts F 201 and by contacts provided on the load switch Q. The load switch has a current coil Q 232, connected in the generator armature, motor armature circuit, and a voltage coil Q 233, connected to the generator armature. These coils act cumulatively when the elevator motor is lifting a load and are adjusted to cause the operation of the switch at balanced load. Upon operation, contacts Q 234 separate, for a purpose to be explained later, and contacts Q 235 engage causing, together with contacts F 201, the short-circuiting of resistance section 207 in the generator field winding circuit, bringing the elevator motor up to the desired speed.

During the starting operation, the steps of resistance in the generator field winding circuit are so proportioned as to suit the requirements of the particular installation both as regards the time for bringing the car up to speed and the smoothness of the starting operation. It has been found that the best results are obtained by making the first step of resistance large and successively decreasing the steps which follow. During retardation, however, in order to cause the car to slow down in the desired time interval, which may be less than the time interval during starting, and at the same time obtain a smooth retarding operation, it has been found that the first step of resistance cut in the circuit of the generator field winding should be large as compared with the last step of resistance cut out during starting and that the last step of resistance cut in during stopping should be correspondingly reduced so as to be small as compared with the first step of resistance cut out during starting. Such operation is obtained by means of the speed control switch Z.

As has already been explained, contacts Z 212 are separated and contacts Z 210 are in engagement during the starting operation. Thus, the first step of resistance to be cut out during starting comprises sections 184 and 185 of resistance 32, the second step section 197, of less ohmic value, and the third step section 206, of still less ohmic value. In the stopping operation, however, contacts Z 212 are in engagement and contacts Z 210 are separated so that the first step of resistance to be cut in comprises sections 206 and 204, the second step, section 197, and the third step, section 184, switch Z being held in during retardation as previously set forth. The load switch Q, by means of its contacts Q 224, assists in bringing the car to an accurate stop under different conditions of load, as may better be seen from examples.

Assume that the car is traveling down with full load which means that the elevator motor armature is supplying current to the generator armature and therefore that the generator series field is opposing the separately excited field. The load switch Q, therefore, is not operated, its contacts Q 234 being in engagement and its contacts Q 235 being separated. Thus, when contacts F 200 are separated upon the initiation of the stopping operation, only resistance sections 206 and 204 are reinserted in circuit with the generator field winding 21. The reinsertion of these resistance sections reduces the generator E. M. F. and therefore increases the regenerative braking action, slowing down the elevator motor. Similarly the reinsertion of resistance sections 197 and 184 by the separation of contacts E 189 and D 177 increases the regenerative braking action, further reducing the speed of the motor. The values of these resistance sections may be adjusted so that the desired retardation is obtained.

Assume now that the car is traveling down with light load which means that the generator armature is supplying current to the elevator motor armature and therefore that the generator series field is assisting the separately excited field. The load switch Q, therefore, is operated and its contacts Q 234 are separated. Thus, when contacts F 200 separate upon the initiation of the slow-down operation, a larger step of resistance is reinserted in the circuit of the generator field winding 21, such step comprising resistance section 205 as well as sections 206 and 204. In this manner, the tendency of the series field to keep the generator E. M. F. above the counter E. M. F. of the elevator motor is overcome by a large reduction in the generator field strength. Thus, regeneration is immediately effected. As soon as the elevator motor starts to regenerate, the current in the generator series field winding is reversed, the series field then acting to assist in the retardation. It will be obvious that several load switches may be employed and so calibrated as to operate at different values of load.

It is to be noted that, once the first accelerating switch D has operated during acceleration, its contacts D 175 cause the energization of the holding coils for the operated direction switch and the brake and field switch. Thus, the direction switch and brake and field switch are maintained operated, unaffected by contacts S 138 of the sequence relay. The sequence relay, however, is provided with additional contacts S 139, as previously explained, these contacts controlling the circuit leading to the actuating coils of the accelerating switches. Thus, should a door on the car gate be opened after the first accelerating switch has operated, the sequence relay S operates to cause the separation of contacts S 139, thus effecting the deenergization of the actuating coil D 145 of the first accelerating switch and also the deenergization of the actuating coils of the other accelerating switches if they have been energized. As a result, the holding coils for the operated direction switch and brake and field switch are deenergized, causing the stopping of the car.

Contacts S 139 also control the circuit for coil MM 155 of the star-delta relay. Thus, should this relay be operated and a door or the car gate be opened, contacts S 139 separate to cause the deenergization of coil MM 155 and thus cause the restoration of the phase windings of the driving motor to star connection. Also, contacts S 139 prevent the operation of the star-delta relay during starting in the event that the door or gate is not closed before the engagement of the car switch segment with a feed contact.

In the event of an extreme emergency, such as a fire, when the gate and doors can not be closed, operation may be had by closing emergency switch 48 to by-pass gate contacts 52, door contacts 53 and sequence relay contacts S 138. Contacts S 138 are by-passed because under normal conditions, with the gate or door contacts open upon the engagement of car switch segment 125 with a feed contact, the sequence relay operates to separate contacts S 138, preventing the starting of the car. With the emergency switch closed, both coils S 128 and S 130 are energized when the segment 125 engages a feed contacts, permitting the starting of the car. It is to be noted that contacts S 139 remain in engagement when the emergency switch is closed, permitting the operation of the star-delta relay to control the connections for the phase windings of the driving motor.

Safety switch 47 is provided for stopping the car in case of an emergency. The opening of this switch breaks the circuit for coil A 82, permitting the potential switch to drop out. Contacts A 107 and A 108 thus separate, breaking the circuit for the separately excited field winding of the generator and for the brake release coil, causing the stopping of the car. It is to be noted that the opening of the safety switch also breaks the circuit for the actuating coils of the switches controlled by the car switch and for the holding coils for the direction switch, brake and field switch and first accelerating switch. In the event of dangerous overspeed of the elevator car, governor switch contacts G 105 separate, causing the dropping out of the potential switch and thus the stopping of the car, contacts G 105, once separated, remaining so until reset. The opening of any of the "safety switches" which may be included in line 102 or of contacts J 101 or contacts L 77 effects the stopping of the car in the same manner.

The driving motor may be brought to a stop by turning the start control switch counter-clockwise to stop position, causing the disengagement of bridging contacts 58 and 59 from contacts 60 and 61. As a result, the holding circuit for coil LL 62 of the driving motor starting relay is broken. Relay LL, therefore, drops out, causing the separation of its contacts LL 77 and LL 73. Contacts LL 72, upon separating, break the circuit for coil L 74 of the driving motor line switch. The separation of contacts LL 73 breaks the circuit for coil R 75 of the running relay.

The line switch L, upon dropping out, causes the separation of its contacts L 77, L 78 and L 80 and the engagement of its contacts L 76. The separation of contacts L 78 and L 80 breaks the circuit for the driving motor stator windings. Contacts L 77, as previously explained, are in the circuit for the actuating coil A 82 of the potential switch. Thus, in the event that the elevator car is in operation at the time that the circuit for the driving motor is broken, the potential switch is caused to drop out to bring the elevator motor to a stop, preventing the generator operating as a motor, under overhauling load conditions, to drive the driving motor and exciter and thus permit the elevator car to continue in operation. Contacts L 76, upon reengagement, short-circuit coil J 81 of the minimum current field relay to prevent the restarting of the elevator motor on a weak field as previously explained.

The running relay R, upon dropping out, causes the separation of its contacts R 88 and R 89. The separation of contacts R 88 breaks the circuit for the primary winding T 91 of the lighting transformer, resulting in the discontinuance of the supply of current to the lamp 92. At the same time, the separation of contacts R 89 opens the portion of the holding circuit for coil LL 62 between this coil and the start control switch. Thus, as the light of lamp 92 is extinguished, the operator may release the start control switch which is returned to off position, the circuit for coil LL 62 remaining broken at contacts R 89. Switch L, upon dropping out, also breaks the circuit for coil P 86 of the protective relay. This relay, upon dropping out, causes the separation of its contacts P 87, these contacts also being in the holding circuit for coil LL 62. The purpose of protective relay P is to cause the dropping out of line switch L to effect the separation of its contacts L 78 and L 80 in power mains 38 and 40 and of its contacts L 77 to cause the stopping of the elevator motor in the event that the star-delta switch M does not function properly upon operation to change the connections for the phase windings of the driving motor. In order that this may be readily understood, assume that the switch M, upon operating to change the connections for the phase windings from start to delta, fails to cause the engagement of contacts M 167, M 168 and M 169 or fails to cause good contact engagement of these contacts after causing the separation of contacts M 165 and M 166. Under such conditions, coil P 86 is deenergized, resulting in the separation of contacts P 87 in the holding circuit for coil LL 62 of the driving motor starting relay. Relay LL, as above explained, upon dropping out, causes the deenergization of coil L 74 of the line switch, this switch dropping out in turn to cause the separation of its contacts L 78 and L 80 in mains 38 and 40 and of contacts L 77 in the circuit for coil A 82 of the potential switch. Thus, the elevator motor is brought to a stop. Otherwise, should the faulty operation of switch M occur under overhauling load conditions, the generator would act as a motor to drive the driving motor and exciter, permitting the elevator motor to continue in operation and, with the driving motor exerting no braking action, dangerous overspeed of the elevator motor might result. Relay P does not drop out under normal conditions during the change over of the connections for the driving motor phase windings as the motor field is sustained over this transition period to maintain coil P 86 energized.

Contacts M 70 of the star-delta switch, as previously explained, are separated upon operation of the switch to change the connections of the phase windings of the driving motor from star to delta, these contacts being in the operating circuit for coil LL 62 of the driving motor starting relay. Thus, in the event that the phase windings of the driving motor are connected delta at the time that the start control switch is moved to start position, contacts M 70 are separated, preventing the starting of the driving motor.

It is to be noted that coil LL 62 of the driving motor starting relay and coil L 74 of the driving motor line switch are connected to different phases of the source of supply, coil LL 62 being connected across mains 39 and 40 and coil L 74 across mains 38 and 39. Such arrangement prevents the starting of the driving motor in the event of phase failure and also causes the driving motor to be shut down in the event that phase failure occurs during its acceleration.

In the event of sustained overload on the driving motor, the relays U and V operate to separate their contacts U 65 and V 66, these contacts being arranged in the holding circuit for coil LL 62 of the starting relay. Relay LL, as above explained, upon dropping out, causes the disconnection of the driving motor from the mains and the bringing of the elevator motor to a stop. Each of the relays U and V is provided with suitable means, such as a dash-pot as illustrated in Figure 2, for timing its operation. Each relay is set to operate when the current flowing in its coil reaches a certain value above full load current, the dash-pot preventing the separation of the relay contacts in case of temporary overloads. In the event that current of a value for which the relay is set continues to flow for a predetermined time interval, the relay operates to separate its contacts. In case of heavier current flow, as in the case of considerable overload, the time element of the relay is shortened. It is to be noted that coil U 83 of relay U is arranged in main 38 and that coil V 85 of relay V is arranged in main 40, affording protection in the event of overload in all phases or in any one phase. Thus, one or the other of the relays operates to effect the disconnection of the driving motor from the mains and the stopping of the elevator motor upon the occurrence of a sustained overload condition resulting from single phasing.

In case of sustained flow of overload current in the generator armature, motor armature circuit, the generator overload relay O operates to cause the separation of its contacts O to 64. The coil O 240 of the generator overload relay is arranged in the generator armature, motor armature circuit and the contacts O 64 are arranged in the holding circuit for coil LL 62 of the driving motor starting relay. Thus, upon the separation of contacts O 64, the starting relay drops out to cause the disconnection of the driving motor from the mains and the stopping of the elevator motor. The generator overload relay, as in the case of the driivng motor overload relays U and V, is provided with suitable means, such as a dash-pot as illustrated in Figure 2, for timing its operation. The setting of the relay is such that it operates when the current in its coil reaches a certain value, the dash-pot preventing the separation of the relay contacts in case of temporary overloads. Thus, should current of a value for which the relay is set continue to flow for a predetermined time interval, the relay operates to separate its contacts. In the event that the current through coil O 240 is considerably in excess of the value for which the relay is set, the time element becomes correspondingly less. Relay O also affords protection against phase reversal. Assuming that the phases are reversed at the time that the start control switch is thrown to start position, the driving motor starts in operation in a direction opposite to that in which it normally runs. Thus, the generator is driven in a reverse direction. As a result, the generator becomes self excited owing to the fact that contacts H 150 connect field winding 21 to the generator armature in such manner as to oppose the generator E. M. F. when the generator is driven in the proper direction. Thus, the generator E. M. F. builds up and, as the electromagnetic brake is not lifted, the current soon reaches a value to cause the operation of relay O to shut down the motor-generator set.

No mechanism for bringing the car to a level with the floor in stopping has been shown in the drawings, such mechanism having been omitted for purposes of simplification. It is to be understood, however, that such mechanism may be employed, if desired, and in such case, it would be preferred to control the star-delta switching arrangement in such manner as to have the driving motor connected star during the leveling operation.

The driving motor is designed for operation under full speed running conditions with delta connected stator windings. As has been seen from previous description, these windings are connected star for starting the driving motor in operation, greatly reducing the starting current and permitting the motor to be connected directly to the power mains without the employment of a compensator or other starting device. Not only is the star connection employed for starting but also when the driving motor is idling. Thus, the magnetizing current is decreased and the power factor of the line is materially increased over that which would be obtained were the driving motor windings delta connected. Furthermore, the no-load losses are considerably reduced. The phase windings of the driving motor are maintained star connected so long as the elevator motor is not operated above a certain speed as sufficient torque is developed by the driving motor to afford satisfactory slow-speed elevator operation. However, should faster operation of the elevator motor be desired, the phase windings of the driving motor are automatically changed from star to delta connection. Thus, delta connected driving motor stator windings are had for full speed operation of the elevator motor and sufficient torque is developed by the driving motor for all load conditions. As previously explained, condensers 42, 43 and 44 are connected across the mains for further improving the power factor. Owing to the fact that the power factor is considerably improved during idling and slow speed operation of the elevator by having the phase windings of the driving motor connected star, the condensers may be considerably smaller than would be employed to obtain the same power factor correction if the windings were connected delta during this period. The amount of power factor correction would depend upon the requirements of the particular installation.

An arrangement in accordance with this invention is of particular importance to consumers who are subject to penalities for poor power factor as the average power factor with this arrangement may be made substantially unity. Certain power companies penalize each consumer when the average power factor of this installation is below a certain amount, varying from 80 to 85 per cent. Certain other power companies give a bonus to any consumer when his average power factor is substantially unity or leading. A further advantage to consumers is that a considerable saving in power is obtained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination; an induction motor adapted to run continuously for a considerable period of time under conditions where it runs idle for approximately fifty per cent of the time; means for causing load to be applied to said motor; and means controlled by said first named means for causing said motor to draw magnetizing current of a certain value when it is running fully loaded for reducing the amount of magnetizing current drawn by said motor when it is running idle.

2. In combination; a work motor; a generator; an alternating current motor for continuously driving said generator, said driving motor having polyphase windings; means for causing current to be supplied from said generator to said work motor to cause the operation of said work motor; and means for causing said polyphase windings to be connected in star relation when said work motor is running at a low speed and in mesh relation when said work motor is running at a fast speed.

3. In combination; a work motor; a variable voltage generator for supplying current to said work motor, said generator having a field winding; a source of current for said field winding; an induction motor for continuously driving said generator, said driving motor having polyphase windings; means for causing voltage of a low value to be applied to said generator field winding from its source to cause E. M. F. of low value to be generated by said generator to effect the starting of said work motor; means for causing the voltage applied to said field winding to be increased to increase the generator E. M. F. to such value that full speed operation of said work motor may be obtained; and means for causing said polyphase windings to be connected in star relation when said generator E. M. F. is of a low value and in mesh relation when said generator E. M. F. is of a high value.

4. An elevator system comprising; an elevator car; a hoisting motor for raising and lowering said car; a generator for supplying current to said hoisting motor; an induction motor for continuously driving said generator, said driving motor having polyphase stator windings; means for causing said generator to supply current to said hoisting motor at a variable voltage to cause the operation of said hoisting motor at different speeds; and means for causing said polyphase stator windings to be connected in star relation during inching and slow speed operation of said hoisting motor and in mesh relation during full speed operation of said hoisting motor.

5. In combination; a work motor; a generator; an alternating current motor for driving said generator; a source of alternating current for said driving motor; means for causing a low value of exciting current to be supplied from said source to said driving motor when such motor is idling; and means for causing current to be supplied from said generator to said work motor and for causing the value of said exciting current to be increased.

6. In combination; a work motor; a generator for supplying current to said work motor; an alternating current motor for continuously driving said generator, said driving motor having polyphase windings adapted to be connected in either star or mesh relation; means for causing said polyphase windings to be connected in star relation when the driving motor is driving the generator under conditions where the generator is not supplying current to said work motor; and means for causing current to be supplied from said generator to said work motor and for causing the connections for said phase windings to be changed from star to mesh relation.

7. An elevator system comprising; an elevator car; a hoisting motor for raising and lowering said car; a generator for supplying current to said hoisting motor; an alternating current motor for continuously driving said generator, said driving motor having polyphase windings; means for causing said polyphase windings to be connected in star relation when the driving motor and generator are running idle; and a control switch in the car operable to cause voltage to be applied from said generator to said hoisting motor and to cause the connections for said polyphase windings to be changed from star to mesh relation.

8. An elevator system comprising; an elevator car; a hoisting motor for raising and lowering said car; a generator for supplying current to said hoisting motor; a polyphase alternating current motor for continuously driving said generator, said driving motor having phase windings; a control switch within said car operable to cause said generator to generate sufficient E. M. F. to cause the starting of said hoisting motor and to cause the value of said E. M. F. to be increased to increase the speed of said hoisting motor; and means for causing said phase windings to be connected in star relation when said hoisting motor is at rest and the driving motor and generator are idling and responsive to the operation of said control switch to cause the connections for said driving motor to be changed from star to mesh relation.

9. An elevator system comprising; an elevator car; a hoisting motor for raising and lowering said car; a variable voltage generator for supplying current to said hoisting motor, said generator having a field winding; a source of current for said generator field winding; an induction motor for driving said generator, said driving motor having polyphase stator windings; a source of polyphase alternating current for said polyphase windings; means for causing said polyphase windings to be connected in star relation to said source when said driving motor and generator are running idle; and a manually operable switch within the car for controlling the voltage applied to said generator field winding from its source, thus controlling the speed of said hoisting motor, said manually operable switch having an off position, a first position for causing the connection of said generator field winding to its source at a low value of applied voltage to cause the starting of said hoisting motor, a final position for causing the voltage applied to said generator field winding to be of a value such that full speed operation of said hoisting motor is obtained, and a position between said first and final positions for causing the connections of said polyphase windings of said driving motor to be changed from star to mesh relation.

10. An elevator system comprising; an elevator car; a hoisting motor for raising and lowering said car; a variable voltage generator for supplying current to said hoisting motor, said generator having a field winding; an exciter for supplying current to said generator field winding; a three phase induction motor for driving said generator and said exciter, said driving motor having stator phase windings; a source of three phase alternating current for said phase windings; means for connecting said stator phase windings to said alternating current source to start said driving motor in operation; means for causing said phase windings to be connected in star relation during starting of said driving motor and while said driving motor and generator are running idle; a manually operable switch within the car for controlling the voltage applied to said generator field winding from said exciter, thus controlling the speed of said hoisting motor, said manually operable switch having an off position, a first position for causing the connection of said generator field winding to said exciter at a low value of applied voltage to cause the starting of said hoisting motor, a final position for causing the voltage applied to said generator field winding from said exciter to be of a value such that full speed operation of said hoisting motor is obtained, and a position between said first and final positions for causing the connections of the stator phase windings of said driving motor to be changed from star to delta relation; and means responsive to the voltage of said generator for maintaining said stator phase windings connected in delta relation, after said switch in the car has been returned to off position to effect the stopping of said hoisting motor, until said generator voltage decreases to a certain value.

11. In combination; a polyphase alternating current motor having phase windings; a source of polyphase alternating current for said windings; means for alternatively connecting said phase windings in star or mesh relation; and condensers connected across the different phases of said source.

12. In combination; polyphase alternating current power mains; a polyphase induction motor having phase windings, said motor being adapted to run continuously for a considerable period of time during a portion of which time said motor runs idle; means for connecting said phase windings in star relation to said mains when said motor is idling; means for causing the connections for said phase windings to be changed from star to mesh relation; and condensers connected across said mains, said condensers being of a capacity to give the required average power factor of said mains.

13. In combination; polyphase alternating current power mains; a polyphase induction motor having phase windings, said motor being adapted to run continuously for a considerable period of time under conditions where it runs idle for approximately 50 per cent of such time; means for connecting said phase windings in star relation to said mains when the motor is idling and for changing the connections for said windings from star to mesh relation; and condensers connected across said mains, said condensers being of a capacity to give an average lagging power factor of said mains of at least 80 per cent.

14. An elevator system comprising; an elevator car; a hoisting motor for raising and lowering said car; a generator for supplying current to said hoisting motor; an induction motor for continuously driving said generator, said hoisting motor having polyphase stator windings; polyphase alternating current power mains for supplying current to said polyphase windings; a control switch in said car for causing current to be supplied from said generator to said hoisting motor to effect the operation of said car; means for causing said polyphase windings to be connected in mesh relation when said generator is applying full voltage to said hoisting motor and in star relation when said driving motor and generator are running idle; and condensers connected across said power mains, said condensers being of a capacity to give an average power factor of substantially unity.

15. In combination; a work motor; a generator for supplying current to said motor; a polyphase alternating current motor continuously driving said generator, said driving motor having phase windings; means for causing said phase windings to be connected in star relation when said driving motor and generator are idling; a control switch movable out of off position to cause current to be supplied from said generator to said work motor and to cause the connections for said phase windings to be changed from star to mesh relation; and means for retaining said phase windings in mesh relation for a time after the return of said switch to off position.

16. In combination; a work motor; a generator for supplying current to said motor; a polyphase alternating current motor continuously driving said generator, said driving motor having phase windings; means for causing said phase windings to be connected in star relation when said driving motor and generator are idling; a control switch movable out of off position to cause current to be supplied from said generator to said work motor and to cause the connections for said phase windings to be changed from star to mesh relation; and means for retaining said phase windings in mesh relation after the return of said switch to off position until the voltage of said generator falls to a predetermined value.

17. An elevator system comprising; an elevator car; a hoisting motor for raising and lowering the car; a generator for supplying current to said hoisting motor, said generator having a field winding; a source of current for said field winding; a polyphase induction motor for continuously driving said generator, said driving motor having stator phase windings; means for causing said phase windings to be connected in star relation when said driving motor and generator are idling; a control switch in the car, said switch having an off position, a first position for causing said field winding to be connected to its source at a low value of applied voltage to cause the starting of said hoisting motor, a final position for causing the voltage applied to said field winding to be of a value such that full speed operation of said hoisting motor may be obtained, and a position between said first and final positions for causing the connections of said stator phase windings to be changed from star to mesh relation; and means responsive to the generator voltage for retaining said stator phase windings in mesh relation after the return of said switch to off position until the voltage of said generator decreases to a predetermined value.

18. In combination; a work motor; a generator for supplying current to said motor; a polyphase alternating current motor for continuously driving said generator, said driving motor having phase windings; means for causing said phase windings to be connected in star relation when said driving motor and generator are idling; means for causing current to be supplied from said generator to said work motor to start said work motor; means for causing the acceleration of said work motor; and means for changing the connections of said phase windings from star to mesh relation and for preventing the operation of said accelerating means until after said connections are changed.

19. An elevator system comprising; an elevator car; a hoisting motor for raising and lowering the car; a generator for supplying current to said hoisting motor, said generator having a field winding; a source of current for said field winding; an induction motor for continuously driving said generator, said driving motor having polyphase stator windings; means for causing said polyphase windings to be connected in star relation when said driving motor and generator are idling; a control switch in the car operable to cause voltage of a low value to be applied to said field winding from its source to effect the starting of the hoisting motor and to cause the value of said applied voltage to be increased to bring said hoisting motor up to full speed; and means responsive to the operation of said control switch for changing the connections of said polyphase windings from star to mesh relation and for preventing said increase in the value of the voltage applied to said field winding above said low value before said polyphase windings are connected in mesh relation.

20. An elevator system comprising; an elevator car; a hoisting motor for raising and lowering said car; a generator for supplying current to said hoisting motor, said generator having a field winding; an exciter for supplying current to said generator field winding; a three phase induction motor for driving said generator and said exciter, said driving motor having stator phase windings; a source of three phase alternating current for said driving motor; a two position switch, said switch when in one position connecting said stator phase windings in star relation and when in the other position connecting said stator phase windings in delta relation, said switch being biased to said one position; a second switch operable upon closing to connect said stator phase windings to said alternating current source to start said driving motor in operation, said two position switch being in said one position at such time to cause said stator phase windings to be star connected for starting; means for preventing the operation of said second switch to connect said stator phase windings to said alternating current source in the event that said two position switch is not in said one position; a manually operable switch within the car for controlling the voltage applied to said generator field winding from said exciter, thus controlling the speed of said hoisting motor, said manually operable switch having an off position, a first position for causing the connection of said generator field winding to said exciter at a low value of applied voltage to cause the starting of said hoisting motor, a final position for causing the voltage applied to said generator field winding from said exciter to be of a value such that full speed operation of said hoisting motor is obtained, and a position between said first and final positions for causing the operation of said two position switch to change the connections of the stator phase windings of said driving motor from star to delta relation; means for causing the opening of said second switch and the disconnection of said generator field winding from said exciter to effect the stopping of said hoisting motor in the event that said two position switch, after disconnecting said stator phase windings from star relation, fails to connect them in delta relation; means responsive to the voltage of said generator for maintaining said two position switch in said other position connecting said stator phase windings in delta relation, after said switch in the car has been returned to off position to effect the stopping of said hoisting motor, until said generator voltage decreases to a certain value; and condensers connected across the different phases of said alternating current source, said condensers being only large enough to give the desired power factor correction when the stator phase windings are connected in star relation and the driving motor is running idle.

21. In combination; a work motor; a generator for supplying current to said motor; an alternating current motor for continuously driving said generator; a source of alternating current for said driving motor; means for controlling the value of voltage applied to said work motor by said generator to vary the speed of said work motor; and means controlled by said voltage controlling means for causing less exciting current to be supplied from said source to said driving motor when the driving motor and generator are running idle than when the generator is applying sufficient voltage to said work motor to cause it to run at full speed.

22. In combination; a work motor; a generator for supplying current to said motor; an alternating current motor for continuously driving said generator; a source of alternating current for said driving motor; means for controlling the speed of said work motor; and means controlled by said speed controlling means for causing less exciting current to be supplied from said source to said driving motor when said work motor is running at a slow speed than when it is running at a fast speed.

23. In combination; an alternating current motor; alternating current supply mains for said motor; means for causing said motor to draw exciting current of low value from said mains when said motor is running idle; means for causing load to be applied to said motor; means controlled by said load application causing means for effecting an increase in the value of exciting current drawn by said motor; and capacity means connected across said motor, said capacity means being of such value as to give the desired power factor correction for the low value of exciting current drawn by said motor when said motor is running idle.

24. In combination; a polyphase induction motor; polyphase alternating current supply means for said motor; means for causing said motor when running idle to be connected to said mains in such manner as to draw exciting current of low value therefrom; means for causing load to be applied to said motor; means controlled by said load application causing means for altering the connections between said motor and said mains to effect an increase in the value of exciting current drawn by said motor; and condensers connected across said motor between said connections altering means and said means, said condensers being of such capacity as to give the desired power factor correction for the low value of exciting current drawn by said motor when said motor is running idle.

In testimony whereof, we have signed our names to this specification.

DAVID L. LINDQUIST.
JACOB D. LEWIS.